United States Patent Office 3,411,630
Patented Nov. 19, 1968

3,411,630
DIALYSIS DEVICE FOR PURIFYING BLOOD OR OTHER LIQUIDS
Nils Alwall and Lennart Östergren, Lund, Sweden, assignors to AB Gambro, Lund, Sweden, a Swedish joint-stock company
Filed June 27, 1966, Ser. No. 560,432
Claims priority, application Sweden, July 21, 1965, 9,598/65
6 Claims. (Cl. 210—321)

ABSTRACT OF THE DISCLOSURE

An artificial kidney consisting of a plurality of pairs of semipermeable membrances defining a plurality of generally flat, parallel spaces for the blood to be purified, each space being connected to an inlet and an outlet for the blood to be purified, said pairs of semipermeable membrances being held in spaced relation by spacing members which by their surface configuration support said membrances in shapes that provide a high ratio of area of membrances to the enclosed volume of the space enclosed by them and at the same time provide spaces between adjacent pairs of membranes for the purifying liquid.

---

Figure 1:
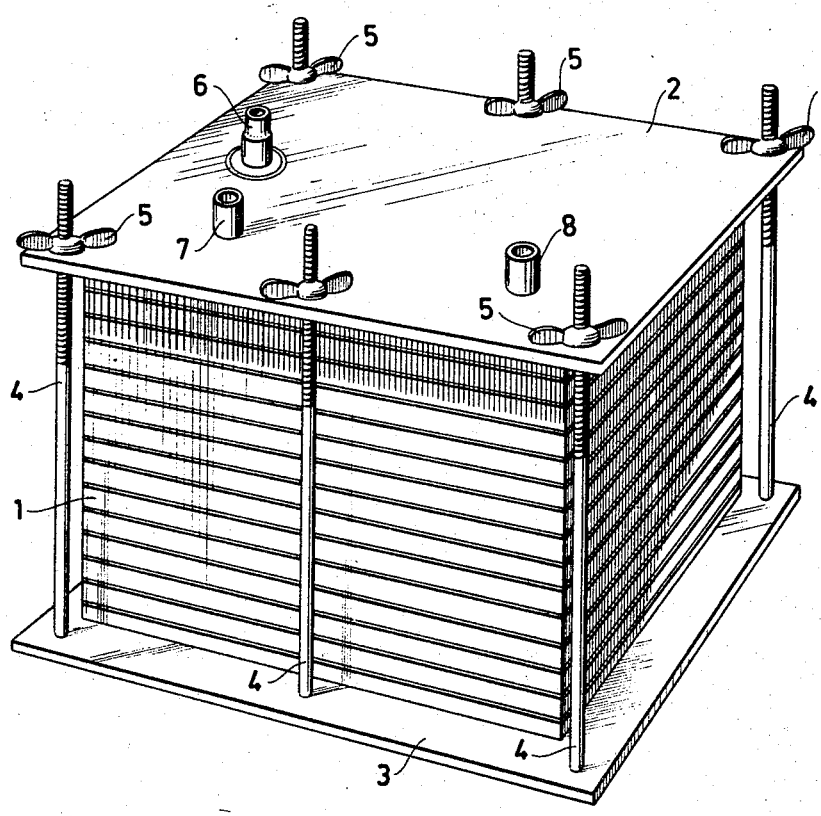

The present invention refers to a device for purifying blood or other liquids by dialysis. In such devices, often called artificial kidneys, impurities in the blood are caused to diffuse out through a semipermeable diaphragm so as to be removed with a purifying liquid, whereby a purifying effect corresponding to that of the natural kidneys of the body is obtained. The blood spaces necessary for the blood liquid may consist of spaces between sheets of semipermeable material laid flatly in pairs, which are sealed along their peripheries and spaced apart so that bag-like containers are obtained. They may also consist of a flat hose which is helically wound. In both alternatives channels for purifying liquid are provided on both sides of the blood spaces.

In the treatment of patients with artificial kidneys it is for several reasons desirable to use the patient's own blood only. To realize this the artificial kidney is connected directly between a big artery and vein of the patient, the patient's own heart functioning as a pumping member. Since only a minor amount of blood may be allowed to be kept apart from the patient, about 30 cls., it is of major importance that this amount of blood is utilized efficiently for obtaining a good dialysis effect. For this reason the diaphragm area which is utilizable for the dialysis is made large relative to the blood space so as thereby to obtain a high so called area/volume ratio. However, it has then been found to be very difficult to make reproducible artificial structures having a predetermined blood space volume. This is related among other things with the bulging of the diaphragm which in the case of prior artificial kidneys is extraordinarily difficult to predict and highly dependent on such factors as the blood pressure of the patient, variations in the pressure of the dialysis liquid and clamping forces of the members which tightly compress the different parts of the artificial kidney. Since it is desirable that the artificial kidneys in full scale manufacture display as small variations of volume among them as possible, said property must be considered to constitute a serious disadvantage in the case of previously known artificial kidneys. An object of the invention, therefore, is to provide a disposable artificial kidney having a well-defined volume and a structure adapted to mass production without harmfully reducing the diaphragm area utilizable for the dialysis.

It is further a desired feature that the amount of blood is distributed in a layer of uniform thickness in the artificial kidney in order that the dialysis effect may be an optimum. Besides this, the flow resistance presented to the blood may be kept at a predetermined acceptable level by the fact that the resistance is not increased on account of variations in the thickness of the blood layer which are difficult to determine. This is of substantial importance, because the patient's heart functions as a pumping member; mechanical pumps are not desirable since blood is a delicate product and may be damaged mechanically.

These and other advantages of the present invention are achieved by means of studded spacing members provided between adjacent parallel blood spaces, said spacing members separating the blood carrying spaces at a definite distance, at the same time as they compress the diaphragms within the well-defined regions into mutual engagement, whereby a closely determined blood space volume and a high area/volume ratio, i.e. a high ratio of the diaphragm area utilizable for the dialysis to the amount of blood occupying the blood spaces, is obtained, passages intended for the purifying liquid also being defined by the spaces between said spacing members and diaphragms and outer sealing members.

More particularly, the objectives of the invention are achieved by use of one or more pairs of spacer plates made from a semi-hard resilient thermoplastic material and a pair of semi-permeable diaphragms located between the plates of each pair. The plates of each pair are provided with arrays of confronting stud portions integral with and projecting from the surfaces of the plates and which have flat end faces that serve to press corresponding surfaces of the diaphragms located between the plates into contact with each other and leaving the remaining surface portions of the diaphragms free to separate to a limited extent to establish spaces therebetween for receiving the blood to be purified. The spaces established between the separable surface portions of the diaphragms and the spacer plates are supplied with a purifying liquid. The stud portions have a polygonal configuration in transverse section thereby establishing a plurality of corners which inherently promote turbulence in the flow of the purifying liquid thus enhancing the desired dialysis effect, and between the stud portions which establish the blood flow spaces between the diaphragms are located other stud portions of lesser height which establish stops limiting separation of the diaphragms.

Figure 2:
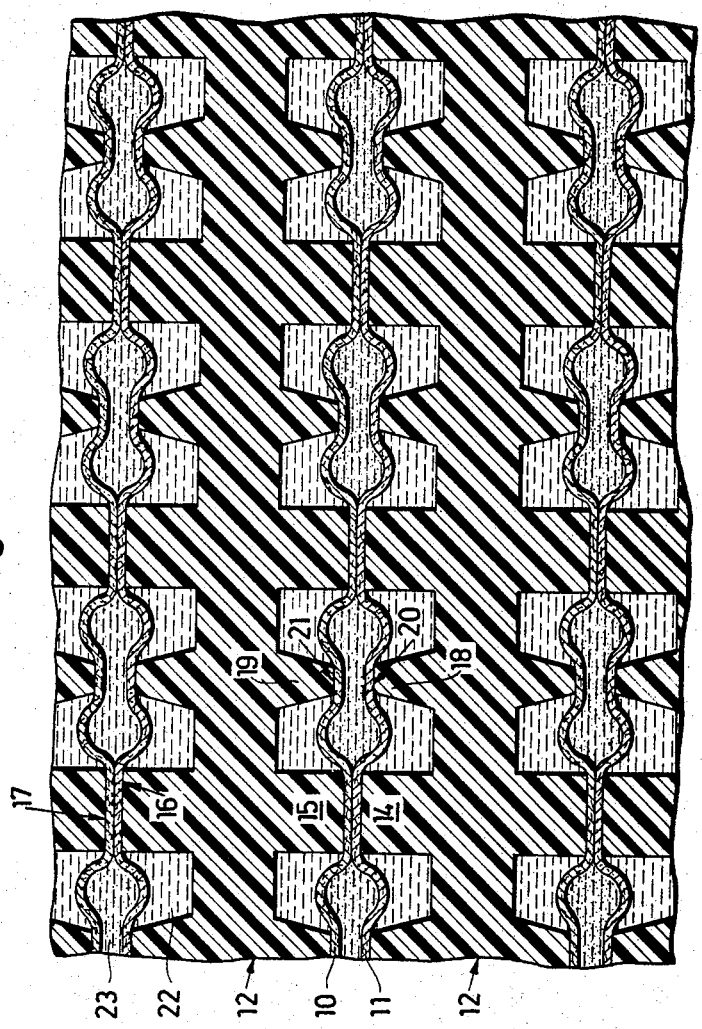
Figure 3:
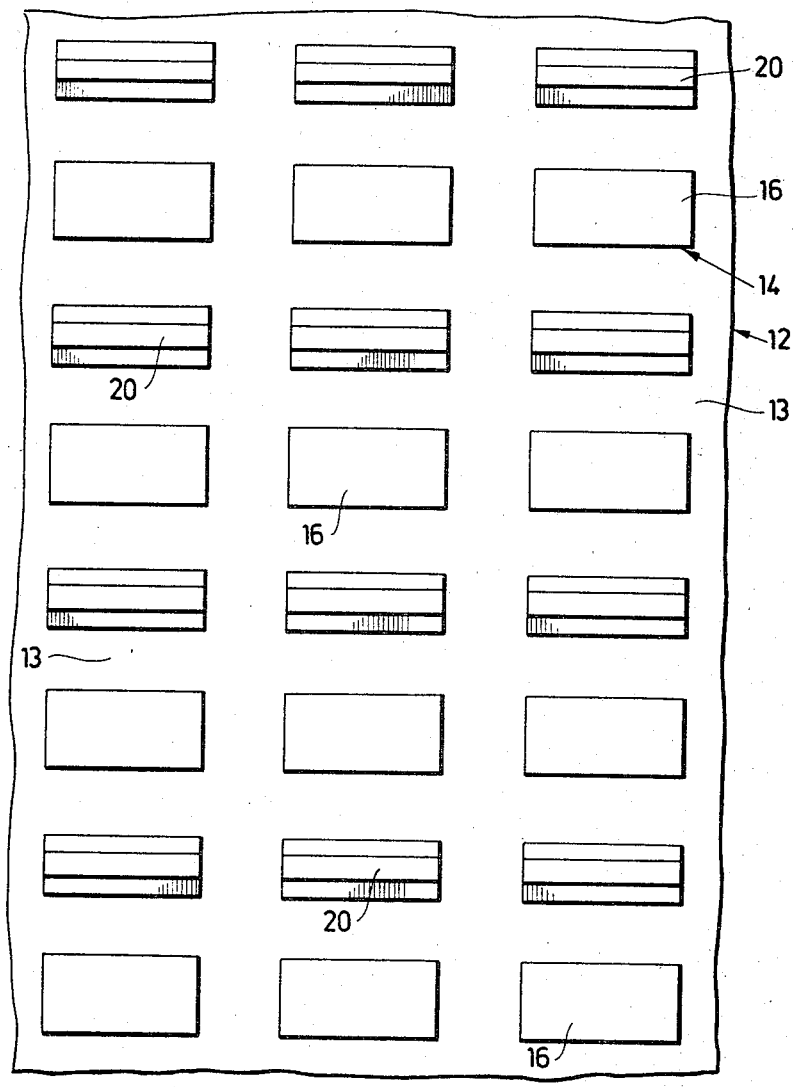
Figure 4:
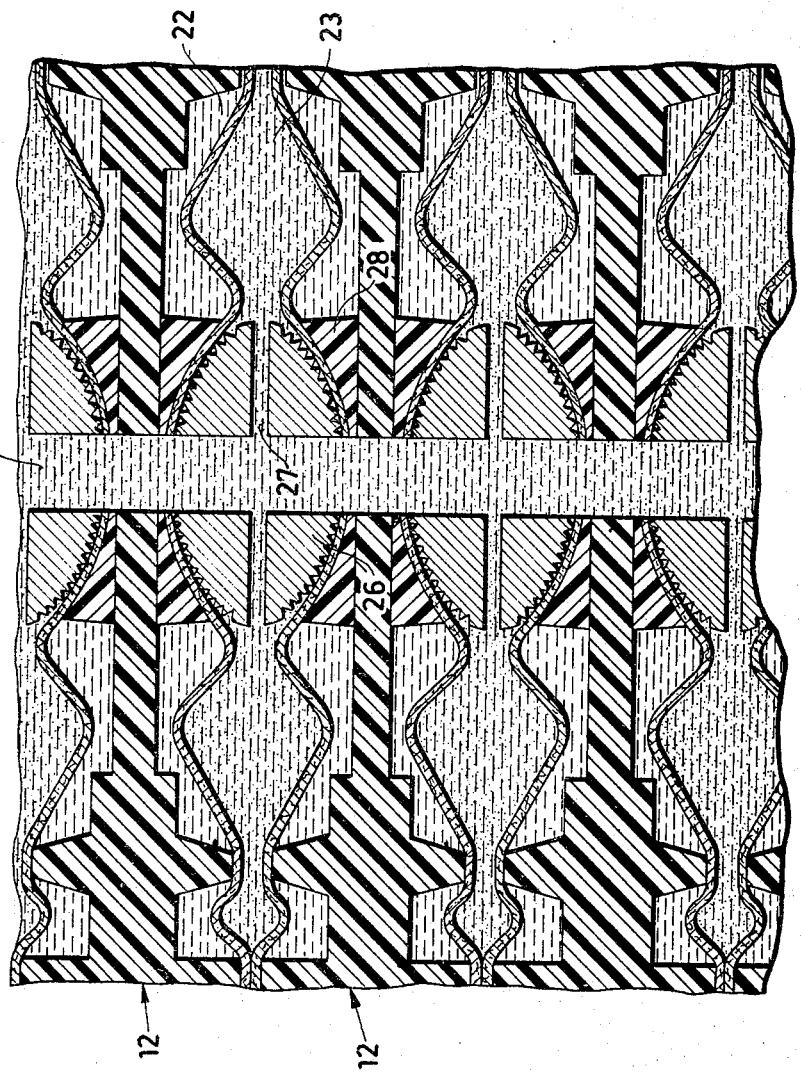
Figure 5:
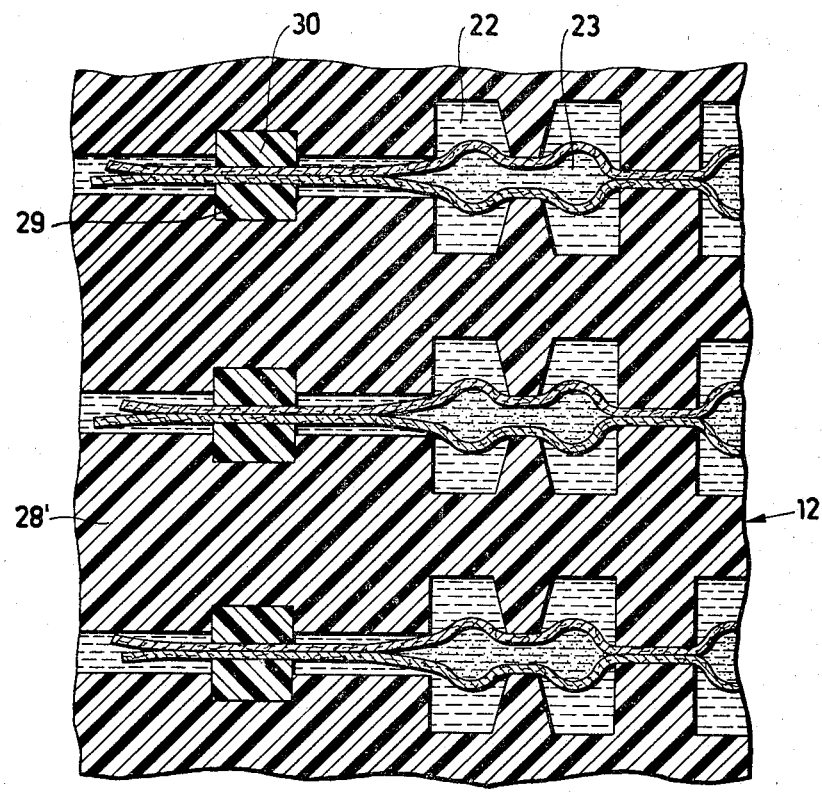

Further characteristics and advantages of the invention will be apparent from the following preferred embodiment thereof which will be described with reference to the accompanying drawings, in which FIG. 1 shows a perspective view of an artificial kidney of a flat type, certain details being omitted to make the essential features better visible, FIG. 2 shows an enlarged section through a portion of an artificial kidney, FIG. 3 shows part of a spacing member as seen from the top or from the bottom, FIG. 4 illustrates how the supply of blood may be carried out, and FIG. 5 shows how certain sealing problems may be solved in the case of a flat artificial kidney.

In FIG. 1 a so called flat artificial kidney is illustrated. It consists of a pile 1 of superposed layers of blood spaces and spaces for purifying liquid, separated by semipermeable diagrams. In the figure, 2 designates an upper plate of thermosetting plastic or metal and 3 designates a lower plate. The pile 1 is kept together and compressed by means of a number of rods 4 which compress the plates 2 and 3 and are threaded at one end and there provided with screw means 5, preferably wing nuts. In the upper plate 2 there is further a supply nozzle 6 for blood and two nozzles 7 and 8 for purifying liquid. Connected to the blood supply nozzle 6 is a passage which runs through all the layers in the pile 1 up to but not through the lower plate 3. In parallel with this passage, at the opposite side of the pile, there is provided a similar passage which runs from the upper plate, through the layers of the pile 1 and through the lower plate 3 in which there is mounted a nozzle for the diversion of purified blood. Connected to the nozzles 7 and 8 are passages running through the pile, corresponding to the blood passages.

From FIGS. 2 and 3 it is seen how the blood and purifying liquid spaces may be arranged. There 10 and 11 designate two diaphragms of a material semipermeable to blood, preferably viscose cellulose, although other materials are also conceivable. When the diaphragms are in the form of sheets, as they usually are in the case of the flat artificial kidney, they are assembled or sealed along their peripheries, see FIG. 5, so that a closed space is obtained between each pair of sheets 10 and 11. In the case of a spiral-shaped kidney, on the other hand, the diaphragm material preferably consists of a flat hose, in which case the need for sealing at the edges becomes unnecessary.

Between each pair of diaphragms 10 and 11 there is arranged a studded spacing member 12. It has a central plate-shaped centre portion 13 situated midway between two pairs of diaphragms 10 and 11. From the centre portion 13 aligned studs 14, 15 extend symmetrically in both directions to establish an array of mutually spaced studs extending throughout the working area of the plate. Each stud 14, 15 is parallelepipedic in shape and will consequently have rectangular surfaces 16 and 17, respectively, parallel with the central portion 13. Because of this parallelepipedic configuration each stud has a polygonal configuration in transverse section which thereby establishes a plurality of corners that inherently promote turbulence in the purifying liquid and therefore improves the dialysis effect.

In parallel with and in the space between the longer sides of the studs there are further arranged other studded members 18 and 19 projecting in each direction from the central portion 13. As will be seen from the figures, these members have a cross-section in the form of an isosceles parallel trapezium having the base turned towards the central portion 13.

The surfaces 20 and 21 of the members 18 and 19, respectively, parallel with the central portion 13 are very small in relation to the surfaces 16 and 17. In the case of the flat artificial kidney both the studs 14, 15 and the members 18, 19 may possibly instead be allowed to be formed as long beads having unchanged cross-sectional dimensions. Such a form must, however, at least in the case of a spirally wound kidney, be considered as less suitable on account of stretching forces which arise in the spacing members due to the curvature of the spiral.

The spacing members 12 are preferably manufactured from a thermoplastic material, for example polyethylene of a semi-hard type, which is therefore somewhat resilient which is easily workable and sufficiently cheap in its price so that the artificial kidney may be manufactured as a disposable article, which is of very great value not least from a hygienic point of view.

By means of the screws 4 and the nuts 5 the various layers of the kidney are compressed. The spacing members 12, which are arranged quite uniformly, will then be moved together with their surfaces 16 and 17 opposite each other. Within the regions well defined by said surfaces the diaphragms 10 and 11 will accordingly be compressed. Within the remaining regions the space 23 between the two semi-permeable membranes 10 and 11 will contain blood liquid. By means of the studded members 18 and 19 the diaphragms are compressed some distance towards each other, as will be apparent from FIG. 2, whereby the blood volume is appreciably reduced without the diaphragm area utilizable for diffusion being reduced more than corresponds to the small surfaces 20 and 21.

Between the spacing members 12 and the diaphragms 10 and 11, the studs 14, 15 and the volume reducing and volume-determining members 18, 19 further form passages 22 for purifying liquid, which may consist of a salt solution, for example NaCl and water.

As mentioned with reference to FIG. 1, the flat artificial kidney is provided with a through channel for supplying untreated blood and a channel for returning purified blood to the patient. Principally, the channels are similarly arranged. The channel 25 shown in FIG. 4 may accordingly illustrate both a supply and a return channel. However, it may be assumed in this case that it is a supply channel for blood to be purified.

The inlet to the channel 25 is then connected to the nozzle 6 shown in FIG. 1. Between the spacing members 12 and the diaphragms 10 and 11, in recessed spaces, there are provided lense-shaped diversion members 26. These are provided with a plurality of diversion tubes 27 which are relatively narrow in relation to the channel 25 and are arranged in jet-like fashion. Through these tubes blood liquid may be transported from the channel 25 into the blood spaces 23. To maintain a good sealing action between the diversion members 26 and the diaphragms 10 and 11 the former are, on the one hand, provided with elevations and depressions in the region of the engagement between said details, packings 28 being besides provided between the diaphragms and the spacing members in a way which is to be seen from FIG. 4.

How the sealing between the outer edges of the diaphragm may be carried out in the case where these are in sheet-form has already been indicated. FIG. 5 shows more closely how the sealing may preferably be carried out while utilizing the spacing members 12. In an extended part 28' of the latter there are cut-out grooves in which packings 29 and 30 are mounted. Where the pile 1 in FIG. 1 is compressed by means of the screws 4 and the nuts 5 the packings 29 and 30 will tightly compress the diaphragms 10 and 11, so that a good sealing action is obtained between the diaphragms, the spaces 22 for the purifying liquid being also sealed.

While the operation of the device will be apparent from that described above, it may nevertheless be explained briefly. From one of the patient's arteries blood is conducted through a hose directly to the artificial kidney, said hose being connected to the nozzle 6 in FIG. 1. The blood will thereby be introduced into the channel 25 provided at one end of the artificial kidney, as shown in FIG. 4. As the blood runs downwards in the passageway 25 a certain amount of blood will be diverted at each diversion member 26 through the diversion passageways 27 at the blood spaces 23 between the diaphragms 10 and 11. At the other side of the diaphragm walls is a salt solution. On account of the osmotic pressure which arises between the blood and the salt solution the impurities existing in the blood will diffuse through the diphragm walls out into the salt solution. The salt is kept circulating all the time, new liquid being supplied through the nozzle 8, while the salt solution which has absorbed the impurities of the blood is withdrawn through the nozzle 7. When the blood has been purified it is diverted through the discharge tube provided at the other end of the artificial kidney.

For a successful process it is, as already mentioned, of importance that the so-called area/volume ratio be kept at a high level, without the flow resistance to the blood being as a consequence too high. Accordingly to the invention, this has been solved by the specially shaped spacing members 12. These have two different elevations. The higher stud-shaped elevations 14 and 15 have relatively large flat top areas which are parallel to the central portion of the spacing member, adjacent spacing members in the artificial kidney having their stud-shaped elevations opposite each other. When the two spacing members are brought together, the movement will be limited by said studs, the surfaces of which will compress the diaphragm material between them within well defined regions. The other elevations have a lower height and a substantially less top area. The shortest distance between two opposite members of the latter kind, i.e. 18 and 19, is determined by the position of the larger stud-shaped elevations 14 and 15, which studs cannot be brought together more than to a certain extent, i.e. until the diaphragm material has been wholly compressed within said regions.

Despite the fact that the parts of the diaphragm area corresponding to the surfaces 16 and 17 of the studs cannot be utilized for dialysis, the area/volume ratio is not thereby reduced, since no blood liquid engages these surfaces. Instead by the engagement of the studs 14 and 15 one with the other, one may closely determine the blood volume, the elevations 18 and 19 forming a valuable complement, the blood volume being reduced in a desired manner and to a desired extent without the utilizable diffusion area being appreciably reduced.

So as additionally to ensure the precise volume of the artificial kidney the studs 14 and 15 may be made so resilient that the whole kidney is compressed, if the pressure in the salt solution decreases. Thereby the smaller volume adjusting members 18 and 19 are brought closer together, the blood volume decreasing. The artificial kidney will thus be self-controlling against the pressure variations of the dialysis liquid, whereby the blood volume which would otherwise increase may be maintained constant.

We claim:

1. In a dialysis device for purification of blood, the combination comprising at least one pair of spacer plates each having an array of stud portions integral with and projecting from the surface of said plate and located in spaced relation throughout the area of said plate, said stud portions having flat end faces and the stud portions of one plate of each pair being in alignment with and confronting the stud portions of the other plate of the same pair, said plates and said integral stud portions being made of a semi-hard resilient thermoplastic material, a pair of semi-permeable diaphragms located between said pair of plates, clamping means for clamping said pair of plates and said diaphragms together under compression, all of said confronting stud portions being under compression as a result of the combined effect of the resilience of the thermoplastic plate material and the clamping pressure, said flat end faces of said confronting stud portions of said plates serving to press corresponding surface portions of said diaphragms into contact with each other and leaving the remaining surface portions of said diaphragms free to separate from one another to establish spaces therebetween for receiving the blood to be purified, means for supplying blood to said spaces between said diaphragms, and means for supplying a purifying liquid to the spaces established between said remaining surface portions of said diaphragms and said spacer plates, said stud portions having a polygonal configuration in transverse section thereby establishing a plurality of corners which inherently promote turbulence in the flow of the purifying liquid.

2. A dialysis device as defined in claim 1 wherein said stud portions have a rectangular configuration in transverse section.

3. A dialysis device as defined in claim 1 comprising a plurality of pairs of spacer plates and a plurality of pairs of semi-permeable diaphragms located respectively between each pair of spacer plates, each said spacer plate being provided with an array of said stud portions projecting from each side thereof which confronts an array of stud portions on an adjacent plate.

4. A dialysis device as defined in claim 3 wherein said plurality of pairs of said spacer plates are arranged as a stack, wherein said clmping means comprises upper and lower pressure plates at the opposite ends of said stack of plate pairs and means for pressing said pressure plates towards one another thereby to apply a compression force to said stack of plate pairs, and which further includes tubular channels interconnecting all of the blood spaces in the pairs of spacer plates, said tubular channel in the space between the spacer plates of each pair including a diversion member for blood comprising a body having a relatively large central passageway which forms part of said tubular channel and a plurality of relatively small passageways leading from said central passageway to said blood spaces.

5. In a dialysis device for purification of blood, the combination comprising at least one pair of spacer plates each having a first array of stud portions integral with and projecting from the surface of said plate and located in spaced relation throughout the area of said plate, said stud portions having flat end faces and the stud portions of one plate of each pair being in alignment with and confronting the stud portions of the other plate of the same pair, said plates and said integral stud portions being made of a semi-hard resilient thermoplastic material, a pair of semi-permeable diaphragms located between said pair of plates, clamping means for clamping said pair of plates and said diaphragms together under compression, all of said confronting stud portions being under compression as a result of the combined effect of the resilience of the thermoplastic plate material and the clamping pressure, said flat end faces of said confronting stud portions of said plates serving to press corresponding surface portions of said diaphragms into contact with each other and leaving the remaining surface portions of said diaphragms free to separate from one another to establish spaces therebetween for receiving the blood to be purified, each of said pair of spacer plates further including a second array of integral stud portions located in the spaces between the stud portions of said first array, said stud portions of said second array being of a lower height and having a smaller end face area than the stud portions of said first array and which thereby establish stops limiting separation of said diaphragms, means for supplying blood to said spaces between said diaphragms, and means for supplying a purifying liquid to the spaces established between said remaining surface portions of said diaphragms and said spacer plates.

6. A dialysis device as defined in claim 5 wherein said stud portions of said second array have a configuration of a trapezium the bases of which face in the direction of said spacer plate.

References Cited

UNITED STATES PATENTS 2,664,395  12/1953  Marchand _____ 210—321

OTHER REFERENCES

Cole et al.: "The Pumpless Low Temperature Hemodialysis System," Transactions of the American Society for Artificial Internal Organs, received in Patent Office, May 28, 1962, pp. 209–211 and 215–217 relied on. Copies may be ordered from Dr. George E. Schreiner, Dept. of Medicine, Georgetown University Hospital, Washington, D.C.

Someren et al.: "A Simple, No-Prime, Pumpless Artificial Kidney: a Preliminary Report," Transaction of the America Society for Artificial Internal Organs, received in Patent Office, June 4, 1963, pp. 73–78 relied on.

REUBEN FRIEDMAN, *Primary Examiner.*

FRANK A. SPEAR, JR., *Assistant Examiner.*